3,784,591
BIS($\alpha,\beta$-DIHALOALKYL) 1-ACYLOXYALKANE PHOSPHONATES

Arthur D. F. Toy, Stamford, Conn., and Eugene A. Uhing, Ridgewood, N.J., assignors to Stauffer Chemical Company, New York, N.Y.
No Drawing. Filed June 10, 1971, Ser. No. 151,953
Int. Cl. C07f 9/40; C08f 45/58
U.S. Cl. 260—952      7 Claims

ABSTRACT OF THE DISCLOSURE

The new compounds, bis($\alpha,\beta$-dihaloalkyl) 1-acyloxyalkane-phosphonates, and particularly bis(2,3 dihalopropyl) 1-acyloxyalkanephosphonates are disclosed which have been found to be effective flame retardants in various polymer compositions such as polymethyl methacrylate and polystyrene.

---

The present invention relates to new flame retardant compounds which can be effectively used as flame retardant agents in numerous polymer systems and especially in polymethyl methacrylate and polystyrene.

THE INVENTION

In accordance with the present invention there are provided the new flame retardant agents bis($\alpha,\beta$-dihaloalkyl) 1-acyloxyalkanephosphonates which can be represented by the formula:

$$R_1-\underset{\underset{R_2}{|}}{\overset{\overset{X}{|}}{C}}-\underset{\underset{R_3}{|}}{\overset{\overset{X}{|}}{C}}-R_4-O-\underset{\underset{R_5-\overset{|}{C}-R_6}{|}}{\overset{\overset{O}{\uparrow}}{P}}-O-R_4'-\underset{\underset{R_3'}{|}}{\overset{\overset{X'}{|}}{C}}-\underset{\underset{R_2'}{|}}{\overset{\overset{X'}{|}}{C}}-R_1'$$

$$\underset{R_7}{\overset{O}{\underset{\diagdown}{C}}}\diagup^O$$

wherein X equals the same halogen of chlorine or bromine, $R_1$, $R_2$, $R_3$, $R_5$, and $R_7$ represent hydrogen or $C_1$ to $C_8$ alkyl, $R_6$ represents $C_1$ to $C_8$ alkyl and $R_4$ represents a $C_1$ to $C_6$ alkylene radical and lower alkyl ($C_1$–$C_4$) substituted derivatives thereof. The radicals X', $R_1'$, $R_2'$, $R_3'$, and $R_4'$ have a corresponding definition to X, $R_1$, $R_2$, $R_3$, and $R_4$, and can be the same or different from those radicals, preferably the same. Preferably the new flame retardant agents are bis(2,3-dihalopropyl) 1-acyloxyalkanephosphonates which can be represented by the formula:

$$\left[R_1-\underset{\underset{R_2}{|}}{\overset{\overset{X}{|}}{C}}-\underset{\underset{R_3}{|}}{\overset{\overset{X}{|}}{C}}-\underset{\underset{R_y}{|}}{\overset{\overset{R_z}{|}}{C}}-O-\right]_2\overset{\overset{O}{\uparrow}}{P}-\underset{\underset{R_6}{|}}{\overset{\overset{R_5}{|}}{C}}-O-\overset{\overset{O}{\|}}{C}-R_7$$

wherein $R_1$, $R_2$, $R_3$, $R_5$, $R_6$, $R_7$ and X are as depicted above, and $R_x$ and $R_y$ independently represent $C_1$ to $C_4$ alkyl and hydrogen. $R_1$, $R_3$, $R_x$, $R_y$, and $R_5$ are preferably hydrogen and the halogen radical is preferably derived from bromine. $R_6$ and $R_7$ are preferably alkyl groups having one carbon atom.

Polymers and processed polymers which can be effectively flame retarded by these compounds can be illustrated by polyurethanes, cellulosics and modified cellulosics (cellulose acetate and rayon), vinyls including styrene, polyolefins, unsaturated polyester, acrylics, including acrylonitrile, polyacetals and epoxys.

The preferred compounds of the present invention are bis(2,3 - dihaloalkyl) 1-acyloxyalkanephosphonates and will be used for illustration. The dihaloalkyl groups are based on a normal propyl group, e.g., a carbon chain of 3, and which have halogens of either chlorine or bromine attached to both the 2 and 3 positions of the propyl group. In addition to hydrogen, the propyl group can also be substituted with other non-interfering organic groups. The terminal or number 3 carbon can be substituted with one or more lower alkyl radicals having from 1 to 8 carbons illustrated by methyl, ethyl, propyl, isopropyl, butyl, isobutyl, pentyl, hexyl, heptyl, and octyl, as well as with the corresponding halogen derivatives (chlorine and bromine) thereof. These halo-substituted alkyls (haloalkyls) can be illustrated by chloromethyl, chloroethyl, chloropropyl, chlorobutyl, and the like, and the corresponding bromine derivatives. The number 1 and 2 carbons can be substituted with a $C_1$ to $C_8$ lower alkyl radical such as those given hereinbefore.

The 2,3 dihaloalkyl groups discussed above satisfy 2 of the phosphorus valences. The remaining valence of the phosphorus (after the oxygen) is satisfied by a 1-acyloxyalkane group of the formula:

$$-\underset{\underset{R_5}{|}}{\overset{\overset{R_6}{|}}{C}}-O-\overset{\overset{O}{\|}}{C}-R_7$$

wherein $R_6$ represents alkyl groups of from 1 to 8 carbons while $R_5$ and $R_7$ represent hydrogen or an alkyl group of $C_1$ to $C_8$ carbons as defined hereinbefore. $R_5$ is, preferably, hydrogen or lower alkyl of 1 to 4 carbons and more preferably hydrogen. $R_6$ and $R_7$ are, preferably, lower alkyl of 1 to 4 carbons and more preferably methyl.

The preferred compounds of the present invention can be easily prepared by halogenating (chlorinating or brominating) diallyl 1-acyloxyalkanephosphonate. The methods for halogenating allylphosphates are well known in the prior art and can be illustrated by those set forth in U.S. Pat. 2,574,515.

The diallyl 1-acyloxyalkanephosphonates can be easily prepared by reacting diallyl hydrogen phosphonate with an unsaturated ester such as vinyl acetate in the presence of a sodium alkoxide. This reaction will provide the diallyl 1-acyloxyalkanephosphonate compound which is the intermediate for preparing one of the lower members of the class of compounds claimed in the present invention.

Other methods for preparing the intermediates include the formation of an enol such as by the acid catalyzed addition of acetic acid and acetylene and also the sulfuric acid catalyzed reaction of ketone with acetone, followed by reacting the same with a dialkene phosphonate. The formation of higher ketones into their enol acetates is accomplished by the acetate exchange with the isopropenyl acetate in the presence of paratoluene sulfonic acid. Ketones which can be used are illustrated by methyl ethyl ketone, diethyl ketone, acetophenone and the like.

Also, compounds within the broad scope of the invention can be prepared by the reaction of dialkene phosphonates of the formula:

$$\left[\left(R_1-CR_2=CR_3-R_4O\right)_2\overset{\overset{O}{\|}}{\underset{H}{P}}\right]$$

with aldehydes (except formaldehyde) and ketones to yield $\alpha$-OH phosphonates $$\left[(R_1-CR_2=CR_3-R_4-O)_2\overset{\overset{O}{\uparrow}}{P}-\underset{\underset{R_6}{|}}{\overset{\overset{R_5}{|}}{C}}-OH\right]$$

which can be esterified with ketene or carboxylic acid anhydrides to give $$\left[(R_1-CR_2=CR_3-R_4-O)_2\overset{\overset{O}{\uparrow}}{P}-\underset{\underset{R_6}{|}}{\overset{\overset{R_5}{|}}{C}}-O\overset{\overset{O}{\|}}{C}-R_7\right]$$

Halogenation of these compounds as outlined hereinbefore provides the compounds claimed in the present invention.

Illustrative of the compounds within the scope of the invention are:

bis(2,3-dichloropropyl) 1-acetoxyethanephosphonate
bis(2,3-dibromopropyl) 1-acetoxyethanephosphonate
[(2,3-dichloropropyl) (2,3-dibromopropyl)] 1-acetoxyethanephosphonate
bis(2,3-dichloropropyl) 1-formoylethanephosphonate
bis(2,3-dibromobutyl) 1-acetoxyethanephosphonate
bis(2,3-dibromopentyl) 1-acetoxyethanephosphonate
bis(2-methyl-2,3-dibromopropyl) 1-acetoxyethanephosphonate
bis(2,3-dibromopropyl) 1-acetoxypropanephosphonate
bis(2,3-dibromopropyl) 1-acetoxybutanephosphonate
bis(2,3-dibromopropyl) 1-methyl, 1-acetoxyethanephosphonate
bis(3,4-dibromopentyl) 1-acetoxyethanephosphonate
bis(2,3-dibromopropyl) 2-acetoxy, 2-butane phosphonate
bis(2,3-dibromopropyl) 1-acetoxy-1-phenyl-ethanephosphonate Compounds of the present invention are effective non-reactive flame retardants for various polymer systems which include polyurethanes, either expanded or foamed, and which can be in either the flexible or rigid forms; the cellulosics which include wood pulp, paper, fibre board, and wood fibre as well as cotton and wool; modified celluloses such as cellulose acetate and rayon; olefin polymers such as polyethylene or polypropylene; epoxy polymers, unsaturated polyesters, polyacrylates and methacrylates and their esters and nitriles (acrylonitrile); polyvinyl acetals such as polyvinyl butyral; vinyl polymers such as polyvinyl chloride and polystyrene and the like. Extensive discussions of these polymers are well known in the prior art and can be more fully found in various texts such as Polymers and Resins, Golding, D. Van Nostrand (1959) as well as Kirk-Othmer, Encyclopedia of Chemical Technology, 2nd Edition, by InterScience.

The compositions of the present invention can be applied directly (externally) to polymer systems such as fabrics by padding, dipping, or spraying solutions or other such means in order to effectively provide an added on weight of from 2.5 to 20%, by weight. It is preferred that the treated material contain at least 5%, and preferably from 10% to 20%, of the stated additive in order to provide effective flame retarding results.

The compounds of the present invention can also be utilized internally by admixing with a polymer composition prior to the formation of the polymer such as in the case of the urethanes or prior to the working of the polymer into its various forms such as fibres, films, and the like. Thus, the compounds of the invention can be applied internally (before polymerization) with vinyls. The compounds of the invention can also be added to low melting polymer mixes such as low molecular weight polyvinyl chloride. Solvent addition using a solvent to dissolve both the polymer and the flame retardant is also effective. Thus, and with fibres which are spun from a solvent, the flame retardants of the invention can be applied internally prior to formation of the fibres. For example, acetone can be used as a solvent for cellulose acetate and the compounds of the invention. As the compounds of the invention tend to be temperature sensitive, use in high temperature melt spun fibres (nylon, polyphenylene oxide and Dacron type polyesters) is not recommended. Thus, high temperature processing conditions, e.g., above 250° C. should be avoided.

Also, the compounds of the present invention are sensitive to alkali and thus would not be suitable for internal addition to systems high in alkalinity such as viscous rayon spinning solutions (surface application to the fibres has no effect on the compounds).

It is preferred for effective flame retardancy to load the polymer compositions with from 2.5% to 20%, by weight, of the flame retardant additive. Other materials such as plasticizers and the like can also be present for effective processing of the polymers. Other ingredients such as filler, dyes, pigments, stabilizers and the like can also be present in the polymer without adversely affecting the flame retardancy.

This invention will be more fully illustrated in the examples which follow.

EXAMPLE 1

Preparation of bis(2,3-dibromopropyl) 1-acetoxyethanephosphonate $$(CH_2BrCHBrCH_2O)_2-\overset{\overset{O}{\|}}{P}-CH(CH_3)OC(O)CH_3$$

Bis(2-3-dibromopropyl)-1-acetoxyethanephosphonate was prepared by first preparing diallyl 1-acetoxyethanephosphonate by placing 129.6 grams (0.8 mole) of diallyl phosphonate and 5 milliliters of sodium allylate catalyst solution (10% solution in allyl alcohol and toluene) in a three neck, two liter, round bottom flask equipped with a mechanical stirrer, thermometer, reflux condenser with a nitrogen purge and a dropping funnel. A solid carbon dioxide/methanol cooling bath was placed beneath the flask. The dropping funnel contained 75.8 grams (0.88 mole or 10% excess) of freshly distilled vinyl acetate. The vinyl acetate was added slowly over a one hour period while maintaining the temperature of the reaction mass below 10° C. Upon completion of the addition of the vinyl acetate, an additional 15 milliliters of sodium allylate solution was added very slowly. The use of the solid carbon dioxide methanol bath was continued to keep temperature from going above 20° C. When exotherm ceased, the cooling bath was removed and the mass was allowed to warm to room temperature. The catalyst was neutralized by adding carbon dioxide.

49.6 grams (0.2 mole) of a neutral diallyl 1-acetoxyethanephosphonate was placed into a 500 milliliter 3 neck flask equipped with a mechanical stirrer, reflux condenser, thermometer and a dropping funnel. 100 milliliters of benzene and 4 milliliters of methanol were added to the flask. The mixture was stirred and 64 grams bromine (0.4 mole) was added dropwise. The temperature of the reaction was kept below 5° C. throughout the addition with aid of a solid carbon dioxide/methanol cooling bath. The addition of the bromide required 30 minutes. After the addition was completed, the cooling bath was removed and the mass was allowed to warm to room temperature.

The reaction mass was washed to a pH of 7 using a saturated sodium bicarbonate solution. The layers were separated and the product was dried over sodium sulfate. The product was filtered and the solvent was removed slowly by evaporation in a rotary evaporation flask heated to 60° C. and evacuated to a millimeter of mercury pressure. The structure of the product was confirmed by elemental and nuclear magnetic resonance analytical techniques.

*Analysis.*—Calculated for final product: phosphorus, 5.4%, bromine, 56.2%. Found in final product: phosphorus, 6.0%, bromine, 55.9%.

EXAMPLE 2

Preparation of bis(2,3-dichloropropyl) 1-acetoxyethanephosphonate $$(CH_2ClCHClCH_2O)_2-\overset{\overset{O}{\|}}{P}-CH(CH_3)OC(O)CH_3$$

A neutral sample of 49.6 grams (0.2 mole)

$$(CH_2=CHCH_2O)_2-\overset{\overset{O}{\|}}{P}-CH(CH_3)OC(O)CH_3$$

prepared as shown in Example 1 is chlorinated by bubbling 28.4 grams (0.4 mole) $Cl_2$ gas into the stirred liquid kept at a temperature between −10° C. to 5° C. with a solid carbon dioxide/methanol cooling bath. Upon completion of the addition, the reaction is allowed to warm to 25° C. and kept at this temperature for 30 minutes. The chlorinated product is worked up using the same procedure as shown in Example 1.

EXAMPLE 3

Preparation of bis(2,3-dibromopropyl) 1-formoylethanephosphonates

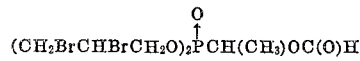

In a 250 milliliter round bottom flask equipped with a mechanical stirrer, thermometer, dropping funnel and under which is positioned a solid carbon dioxide/acetone cooling bath is placed 81 grams (0.5 mole) of diallyl phosphonate, 36.0 grams (0.5 moles) of vinyl formate and the mixture is cooled to 0° C. In the dropping funnel is placed a catalyst solution comprising a 10% solution of sodium allylate dissolved in a 50/50 allyl alcohol/toluene mixture. This catalyst solution was added portion-wise at a rate so that the reaction temperature did not rise above 5° C. The addition of catalyst was stopped after the exothermic reaction ceased. The reaction mixture was allowed to warm to 25° C. and another 1 to 2 milliliters of catalyst was added cautiously. As no temperature rise occurred, the reaction had gone to completed. The catalyst was then neutralized by adding 1 to 2 grams solid carbon dioxide to the reaction mixture. This reaction mixture was brominated by adding 160 grams (1.0 mole) bromine using the same procedure showed in Example 1. The yield of product after washing was 260 grams or 94% of theoretical for

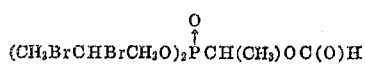

Nuclear magnetic resonance analysis confirmed the structure.

EXAMPLE 4

Other compounds within the scope of the present invention can be easily prepared by varying the phosphonate reactant in the foregong procedures as follows:

(A) Bis(2,3 - dichloropropyl) 1 - formoylethanephosphonate using 117 grams of diallyl 1-formoylethanephosphonate and 71 grams of chlorine in the procedure of Example 3.

(B) Bis(3,4 - dibromobutyl) 1-acetoxyethanephosphonate using 138 grams of bis(3,4-butylene) 1-acetoxyethanephosphonate and 160 grams of bromine in the procedure in Example 1.

(C) Bis(3,4 - butylene) 1-acetoxyethanephosphonate using 95 grams of bis(3,4-butylene) phosphonate and 43 grams of vinyl acetate in the procedure of Example 1.

(D) Bis(4,5 - dibromopentyl) 1 - acetoxyethanephosphonate using 152 grams of bis(4,5-pentylene) 1-acetoxyethanephosphonate and 160 grams of bromine in the procedure of Example 1.

(E) Bis(2,3-dibromopropyl) 1 - acetoxypropanephosphonate using 131 grams of diallyl 1-acetoxypropanephosphonate and 160 grams of bromine in the procedure of Example 1.

(F) Bis(2,3 - dibromopropyl) 1 - acetoxybutanephosphonate using 138 grams of diallyl 1-acetoxybutanephosphonate and 160 grams of bromine in the procedure of Example 1.

(G) Bis(2-methyl,2,3-dibromopropyl) 1 - acetoxyethanephosphonate using 138 grams of bis(2 - methyl-2,3-propylene) 1-acetoxyethanephosphonate and 160 grams of bromine in the procedure of Example 1.

(H) [(2,5 - dichloropropyl)(2,3 - dibromopropyl)] 1-acetoxyethanephosphonate using 124 grams of diallyl 1-acetoxyethanephosphonate and 90 grams of bromine and 35.5 grams of chlorine in the procedure of Example 1.

EXAMPLE 5

The flame retardant additives of the present invention were combined with polymethyl methacrylate and tested as follows:

Polymethyl methacrylate.—Samples of fire retarded polymethyl methacrylate (PMMA) are prepared by dissolving the proper amount of the flame retardant in 100 grams of methyl methacrylate containing 0.04 gram of a polymerization catalyst (azobisisobutyronitrile). The resulting solutions were poured into tubular molds and then heated to a temperature of between about 85° C. and 90° C. The polymerization was allowed to proceed for a period of about 16 hours yielding solid polymer rods having a diameter of 10 mm.

The fire retardancy of the rods was then quantitatively evaluated by determining their Limiting Oxygen Index (LOI) by means of the procedure described in Fenimore and Martin in the November 1966 issue of Modern Plastics. In brief, this procedure directly relates flame retardancy to a measurement of the minimum percentage concentration of oxygen in an oxygen:nitrogen mixture which permits the sample to burn; the LOI being calculated as follows:

$$LOI = \frac{[O_2]}{[O_2]+[N_2]} \times 100$$

Thus, a higher LOI is indicative of a higher degree of flame retardancy.

The following table presents the results of this evaluation.

TABLE I

| Flame retardant | Percent | L.O.I.[1] | Barcol hardness |
|---|---|---|---|
| Blank | 0 | 17.7 | 50 |
| $(CH_2BrCHBrCH_2O)_2P(O)CH(CH_3)OC(O)CH_3$ | 10 | 21.5 | 47 |
|  | 20 | 24.0 | 50 |
| $(CH_2BrCHBrCH_2O)_3P(O)$ | 10 | 20.1 | 45 |
|  | 20 | 22.5 | 40 |

[1] L.O.I.=Limiting Oxygen Index or percent oxygen at which value the sample will burn for less than 3 minutes when ignited in the G.D. Candle Tester. Values are ±.3.

The compound of Example 1 provided better flame retarding characteristics to the polymethyl methacrylate at 10% and 20% loadings than brominated triallyl phosphate. Specifically, at 10% loadings, the compound of Example 1 provided an L.O.I. of 21.5 as against 20.1 for the brominaed triallyl phosphate. At 20% loadings the compound of Example 1 provided an L.O.I. of 24.0 as against 22.5 for brominated triallyl phosphate. The control with no flame retardant gave an L.O.I. of 17.7. The hardness of the polymethyl methacrylate is not decreased by the use of the compounds of the present invention.

These results show that the compounds of the present invention which contain 56% bromine and 5.4% phosphorus are as effective as the brominated triallyl phosphate of the prior art which contains 68.7% bromine and 4.5% phosphorus.

EXAMPLE 6

In a manner similar to the preceding Example 4, rods of rigid polystyrenes were prepared by bulk polymerizing 100 grams of styrene with 5 grams of divinyl benzene in the presence of 0.5 gram of benzoyl peroxide as catalyst and the desired amount of flame retardant. These rods were tested for flame retardancy using the L.O.I. test given above with the following results:

TABLE II

| Flame retardant | Percent | L.O.I.[1] | Barcol hardness |
|---|---|---|---|
| Blank | 0 | 18.9 | 35 |
| $(CH_2BrCHBrCH_2O)_2P(O)CH(CH_3)OC(O)CH_3$ | 10 | 22.1 | 22 |
|  | 20 | 23.4 | 20 |
| $(CH_2BrCHBrCH_2O)_2P(O)CH(CH_3)OC(O)H$ | 20 | 24.9 | 25 |
| $(CH_2BrCHBrCH_2O)_2P(O)$ | 10 | 22.5 | 25 |
|  | 20 | 24-26 | 20 |

[1] L.O.I.=Limiting Oxygen Index as defined above. Hardness is again not affected by the use of the compounds of the invention.

EXAMPLE 7

Cellulose acetate.—Flame retardant films of cellulose acetate are prepared by mixing the flame retardant compounds of Examples 1 and 2 in a 20 weight percent solution of cellulose acetate in an 80/20 acetone/methanol solvent system. The solution is then cast into a 15 mil sheet and air dried for about 1 hour followed by an oven drying at 70° C.–80° C. for about 1 hour. The fire retardant is used in such an amount that the final dry film contains about 20% of fire retardant based on the dry weight of the acetate. Pure acetone can be used instead of the acetone/methanol solvent system.

Thus, all types of both synthetic and naturally derived polymers and compounded polymers may be utilized in preparing fire retardant compositions using the fire retardant additives of the present invention.

All of the disclosed polymer systems are well known and each has extensive utilities well known to those skilled in the art. Some of the polymers are useful as fibre formers whereas others are used for molding compositions or are extruded to form various objects. The compositions of the invention can also be used equally as well for these well known utilities. The flame retardant additives can be used alone or in combination with other flame retardants. The flame retardants are incorporated in or on the polymer as may be appropriate for the form of polymer used. The additives can be incorporated in blends which are used for extrusion, milling injection molding and the like. The additives can be added to polymer solutions which are used to cast films. Also, the additives can be added to spinning solutions. The additives can also be coated onto preformed polymer shapes such as fibre batts, films, etc. This can be accomplished by padding, dipping, spraying (in an appropriate liquid medium) and the like. The fire retardant additives can be added to protective coatings generally applied to the exterior of a structure such as a polymer based paint. These are given only as illustrative of the numerous utilities for the compositions of the invention.

The invention is defined in the claims which follow. What is claimed is:

1. Bis (α,β-dihaloalkyl)1 - acyloxyalkanephosphonates of the formula

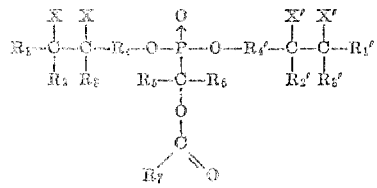

wherein X and X' independently represent halogen of chlorine or bromine; $R_1$, $R_2$, $R_3$, $R_5$, and $R_7$ and $R_1'$, $R_2'$, and $R_3'$ independently represent hydrogen or $C_1$ to $C_8$ alkyl; $R_6$ represents $C_1$ to $C_8$ alkyl, and $R_4$ and $R_4'$ represent $C_1$ to $C_6$ alkylene radicals and $C_1$ to $C_4$ lower alkyl substituted derivatives thereof.

2. Bis(2,3-dihalopropyl) 1-acyloxyalkanephosphonates of the formula:

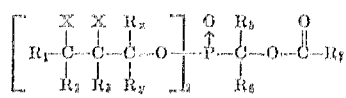

wherein $R_1$, $R_2$, $R_3$, $R_5$ and $R_7$ independently represent hydrogen or $C_1$ to $C_8$ alkyl; and $R_6$ represents a $C_1$ to $C_8$ alkyl radical; $R_x$ and $R_y$ independently represent hydrogen and $C_1$ to $C_4$ alkyl; and X is a halogen radical derived from chlorine or bromine.

3. Bis (2,3-dihalopropyl) 1-acyloxyalkanephosphonates as recited in claim 2 wherein said halogen radicals are derived from bromine.

4. Bis(2,3-dihalopropyl) 1-acyloxyalkanephosphonates as recited in claim 2 wherein said $R_1$, $R_2$, $R_3$, $R_5$, and $R_7$ radicals are hydrogen.

5. Bis(2,3-dihalopropyl) 1-acyloxyalkanephosphonates as recited in claim 2 wherein said phosphonate is O,O'bis (2,3 dibromopropyl) 1-acetoxyethanephosphonate.

6. Bis(2,3-dihalopropyl) 1-acylalkanephosphonates as recited in claim 2 wherein said phosphonate is O,O' bis (2,3 dichloropropyl) 1-acetoxyethanephosphonate.

7. Bis(2,3-dihalopropyl) 1-acylalkanephosphonates as recited in claim 2 wherein said phosphonate is O,O'bis (2,3 dibromopropyl) 1-formoylethanephosphonate.

References Cited

UNITED STATES PATENTS 3,121,106   2/1964   Nagy   260—952

OTHER REFERENCES

Shner et al.: "Chemical Indicas," vol. 21, 63211, (1966).

ANTON H. SUTTO, Primary Examiner

U.S. Cl. X.R.

106—15 FP; 260—45.85 R, 403